US012802567B2

(12) United States Patent
Hirano

(10) Patent No.: US 12,802,567 B2
(45) Date of Patent: Nov. 17, 2026

(54) CONTROL APPARATUS, IMAGE PICKUP APPARATUS, CONTROL SYSTEM, MOVING APPARATUS, CONTROL METHOD, AND STORAGE MEDIUM

(71) Applicant: CANON KABUSHIKI KAISHA, Tokyo (JP)

(72) Inventor: Yusuke Hirano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/022,057

(22) Filed: Jan. 15, 2025

(65) Prior Publication Data

US 2025/0239161 A1 Jul. 24, 2025

(30) Foreign Application Priority Data

Jan. 18, 2024 (JP) ................................ 2024-006076

(51) Int. Cl.
*G08G 1/16* (2006.01)
*G01C 3/02* (2006.01)
*H04N 23/51* (2023.01)

(52) U.S. Cl.
CPC ................ *G08G 1/16* (2013.01); *G01C 3/02* (2013.01); *H04N 23/51* (2023.01)

(58) Field of Classification Search
CPC ............ G08G 1/16; G01C 3/02; H04N 23/51
See application file for complete search history.

(56) References Cited

U.S. PATENT DOCUMENTS

| | | | | |
|---|---|---|---|---|
| 2010/0128140 | A1* | 5/2010 | Iijima | H04N 25/61 348/222.1 |
| 2020/0077027 | A1* | 3/2020 | Onaka | H04N 23/69 |
| 2020/0213487 | A1 | 7/2020 | Nakata | |
| 2021/0360167 | A1* | 11/2021 | Uekusa | H04N 23/667 |
| 2022/0342046 | A1* | 10/2022 | Makita | G02B 7/026 |

FOREIGN PATENT DOCUMENTS

| | | | |
|---|---|---|---|
| CN | 108696678 | B | 1/2022 |
| JP | 2003248162 | A | 9/2003 |
| JP | 6488429 | B2 | 3/2019 |
| WO | 2018042759 | A1 | 3/2018 |

* cited by examiner

*Primary Examiner* — Thai Q Tran
*Assistant Examiner* — Jose M Mesa
(74) *Attorney, Agent, or Firm* — Canon U.S.A., Inc. IP Division

(57) ABSTRACT

A control apparatus controls an image pickup apparatus including an image pickup unit configured to capture image data and a lens unit having a plurality of lenses. The control apparatus includes a processor and a memory storing a program that causes the processor to execute a plurality of tasks. The plurality of tasks includes an acquiring task configured to acquire information regarding a temperature along an optical axis direction of the lens unit and a generating task configured to generate distance measurement data from the image data according to the information regarding the temperature.

17 Claims, 11 Drawing Sheets

CONTROL APPARATUS, IMAGE PICKUP APPARATUS, CONTROL SYSTEM, MOVING APPARATUS, CONTROL METHOD, AND STORAGE MEDIUM

BACKGROUND

Technical Field

The present disclosure relates to a control apparatus capable of acquiring a distance to an imaging target.

Description of Related Art

An image pickup apparatus, which is mounted on a vehicle for capturing images of the vehicle's exterior, has been also used as a distance measuring camera system for measuring a distance to obstacles around the vehicle. Since a focal position of a lens unit within the image pickup apparatus shifts due to temperature changes, it is preferable to correct the focal position to acquire highly accurate distance measurement data. Japanese Patent No. 6488429 discloses a configuration in which a correction lens, capable of adjusting the focal position, is physically moved by a driving unit such as a motor.

The distance measuring camera system mounted on the vehicle is used in harsh environments, where it is exposed to thermal effects, such as sunlight, interior and exterior temperatures, and heat generation from the image pickup apparatus itself, as well as vibration and shock. A configuration that corrects the focal position by moving a lens with the driving unit, as in Japanese Patent No. 6488429, has a complex structure and is challenging to implement in vehicles used over extended periods in such demanding environments due to reliability concerns.

SUMMARY

A control apparatus according to some embodiments controls an image pickup apparatus including an image pickup unit configured to capture image data and a lens unit having a plurality of lenses. The control apparatus includes a processor and a memory storing a program that causes the processor to execute a plurality of tasks. The plurality of tasks includes an acquiring task configured to acquire information regarding a temperature along an optical axis direction of the lens unit and a generating task configured to generate distance measurement data from the image data according to the information regarding the temperature.

Further features of various embodiments of the disclosure will become apparent from the following description of exemplary embodiments with reference to the attached drawings.

DETAILED DESCRIPTION

Figure 1A:
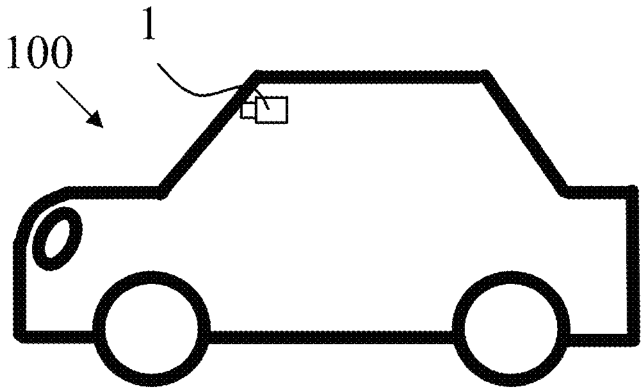
FIGS. 1A, 1B, and 1C are diagrams illustrating a mounting position of an image pickup apparatus on a vehicle according to an embodiment of the present disclosure.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of various exemplary embodiments, features, and aspects according to the disclosure. Corresponding elements in respective figures will be designated by the same reference numerals, and a duplicate description thereof will be omitted.

Arrangement of Image Pickup Apparatus in Vehicle

Figure 1B:
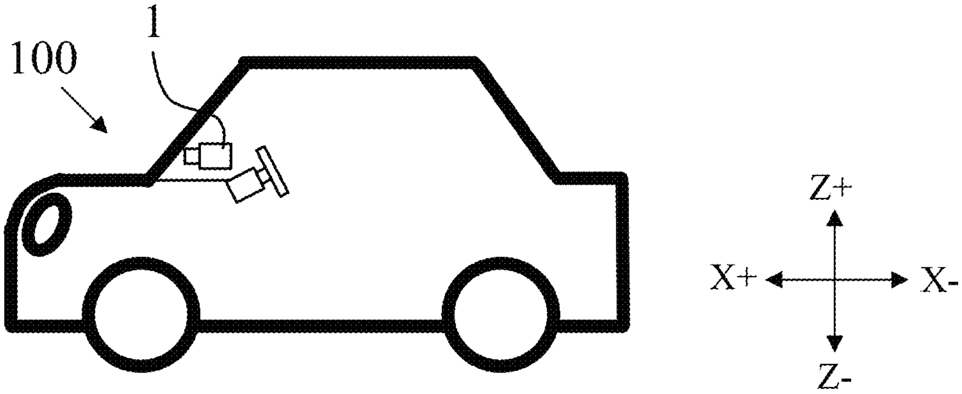
Figure 1C:
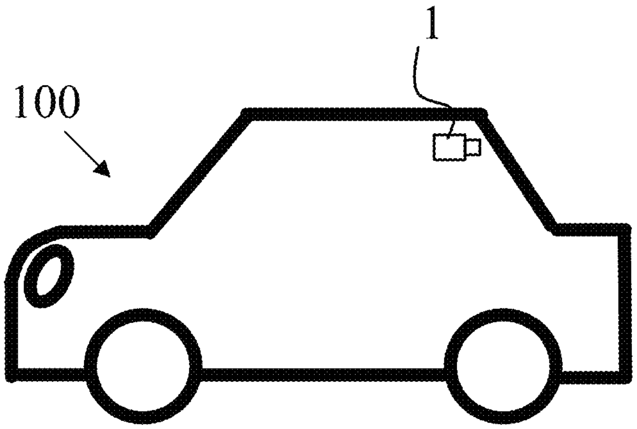

FIGS. 1A, 1*i*, and 1C are diagrams illustrating a mounting position of an image pickup apparatus 1 on a vehicle 100 according to an embodiment of the present disclosure. In this embodiment, the image pickup apparatus 1 is an in-vehicle camera mounted on the vehicle 100 but may be mounted on other types of moving bodies besides vehicles.

FIG. 1A illustrates the image pickup apparatus 1 positioned near an upper portion of a front windshield (front glass) of a vehicle cabin in the vehicle 100. In FIG. 1A, the image pickup apparatus 1 monitors an area in front of the vehicle 100 while driving.

Figure 2:
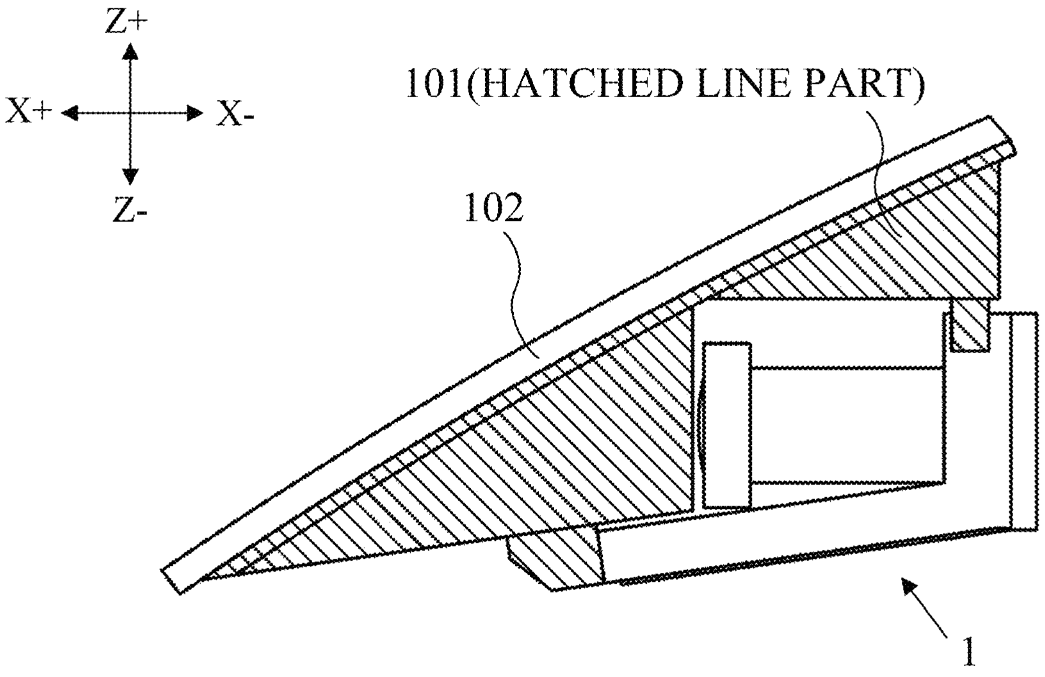
FIG. 2 is a diagram illustrating a method of mounting the image pickup apparatus near an upper portion of the vehicle's windshield.

FIG. 2 is a diagram illustrating a method of mounting the image pickup apparatus 1 near the upper portion of the front windshield of the vehicle 100. The image pickup apparatus 1 is attached to vehicle 100 through a bracket 101. The bracket 101 is adhered to an upper portion side of a front windshield 102 in the vehicle cabin to fix the image pickup apparatus 1. As a fixing method between the bracket 101 and the image pickup apparatus 1, press-fit or a method using fastening components (not illustrated) such as screws is used.

The image pickup apparatus 1 can also be installed in various locations on the vehicle 100. For example, the image pickup apparatus 1 may be mounted on an upper dashboard, as illustrated in FIG. 1B or positioned at a rear of the vehicle 100, as illustrated in FIG. 1C. Additionally, the image pickup apparatus 1 may be installed in various positions to capture side or front/rear images.

Functions of Image Pickup Apparatus in Vehicle and Vehicle Control

Figure 3:
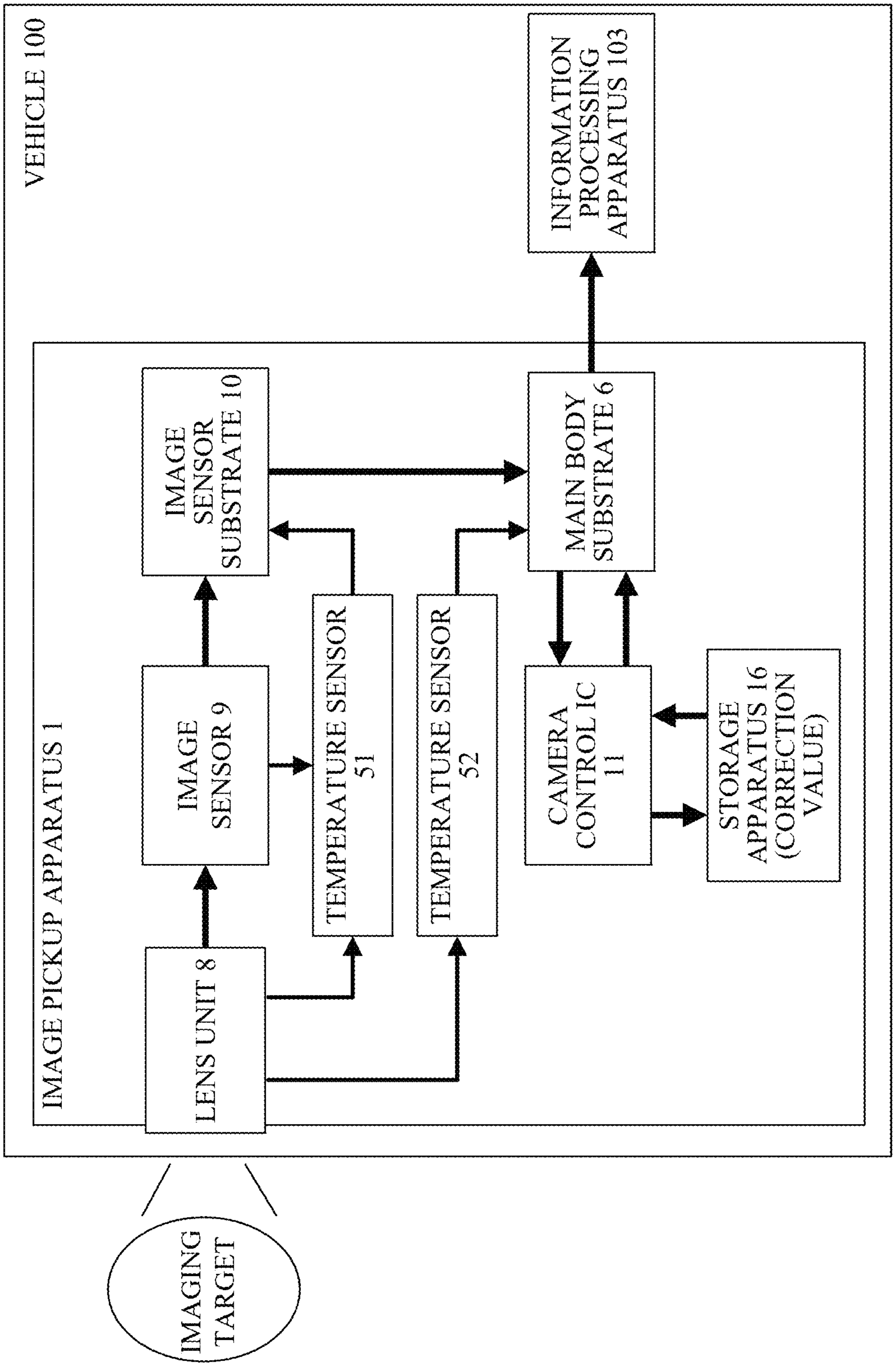
FIG. 3 is a block diagram of the image pickup apparatus.

FIG. 3 is a block diagram of the image pickup apparatus 1. Light from an imaging target enters a lens unit 8. The light reaches an image sensor 9 through the lens unit 8 and is received by the image sensor 9. The image sensor 9 outputs signals corresponding to the received light. The image sensor 9 is a semiconductor image sensor element, such as a CMOS (Complementary Metal Oxide Semiconductor) image sensor or a CCD (Charge-Coupled Device) image sensor. Additionally, the image sensor 9 is capable of measuring phase differences (displacement in image signals) by dividing a single pixel into a plurality of photodiodes, and the image pickup apparatus 1 can acquire distances to obstacles around the vehicle using an imaging plane phase difference method. In the imaging plane phase difference method, a camera control integrated circuit (IC) (control apparatus) 11, described later, estimates distances using the displacement in image signals generated as light enters a plurality of pixels through the lens unit 8.

The image sensor substrate 10 is equipped with a signal output circuit and a first temperature sensor (detector) 51. The signal output circuit outputs an image signal representing an image of the imaging target to a main body substrate 6 according to signals output from the image sensor 9 based on the light, which is incident to the lens unit 8. The first temperature sensor 51 acquires (detects) a temperature (second temperature) of the image sensor 9 and the lens unit 8 on a side of the image sensor 9. The signal output circuit outputs the temperature obtained by the first temperature sensor 51 to the main body substrate 6.

In this embodiment, the image sensor 9 and the image sensor substrate 10 function as an imaging unit (image pickup unit) that captures image data.

The main body substrate 6 is equipped with the camera control IC 11 and a second temperature sensor 52. The camera control IC 11 processes the image signal output from the signal output circuit and generates distance measurement data. The second temperature sensor 52 acquires (detects) a temperature (first temperature) of the lens unit 8 on an imaging target side.

Based on the temperatures obtained by the first temperature sensor 51 and the second temperature sensor 52, the camera control IC 11 determines a correction value from correction value information stored in a storage apparatus 16 and corrects the generated distance measurement data using the correction value. The image signals processed by the camera control IC 11 can be output from the main body substrate 6 to an information processing apparatus 103 in the vehicle 100.

In this embodiment, the camera control IC 11 functions as an acquiring unit for acquiring information regarding a temperature along an optical axis direction of the lens unit 8, and as a generating unit for generating the distance measurement data from the image data according to the information regarding the temperature. Furthermore, the camera control IC 11 is mounted in the image pickup apparatus 1 in this embodiment but may be mounted on the vehicle 100.

First Embodiment

Figure 4A:
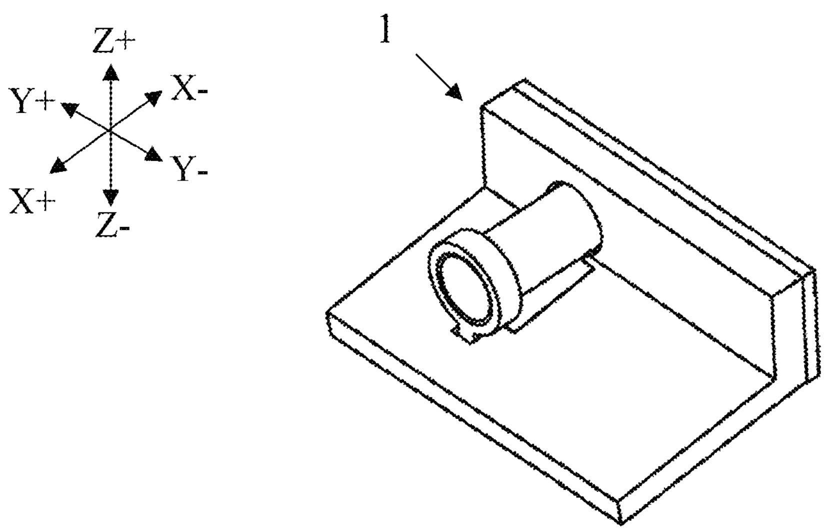
FIGS. 4A and 4B are explanatory diagrams of the image pickup apparatus according to a first embodiment.
Figure 4B:
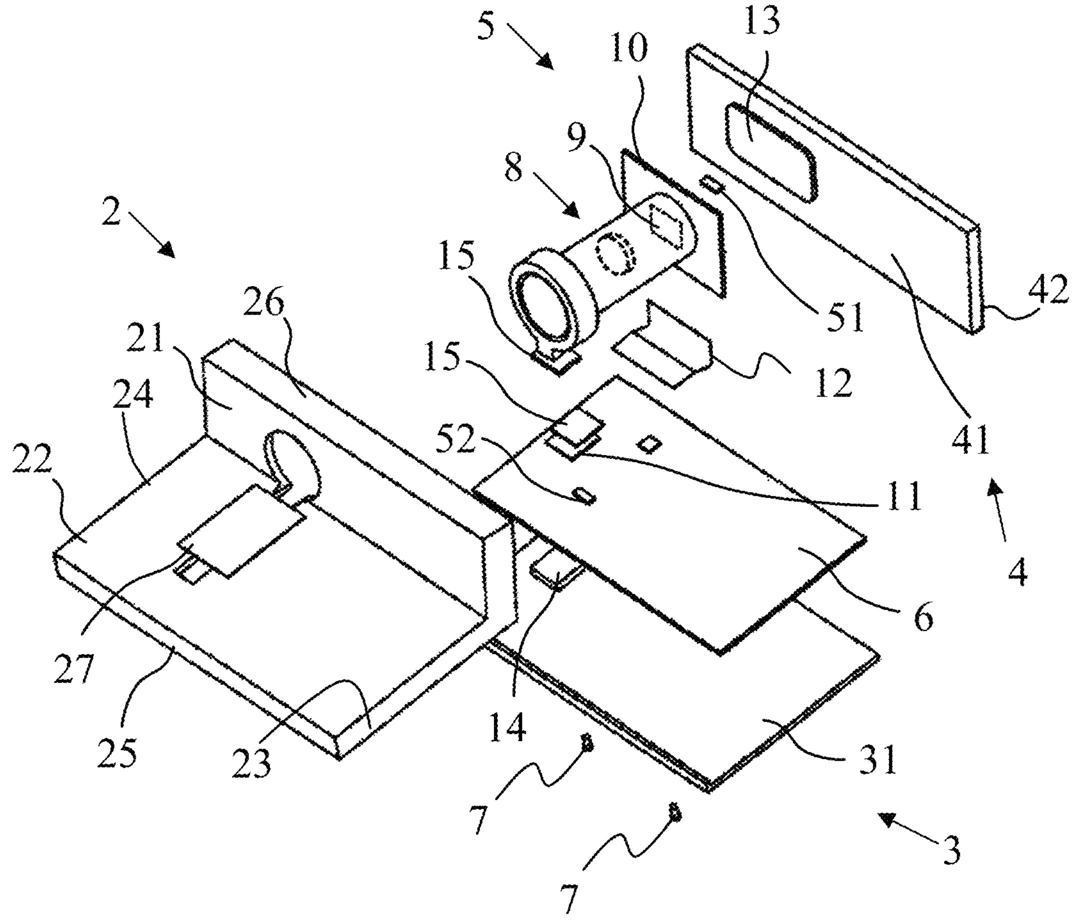
Figure 5:
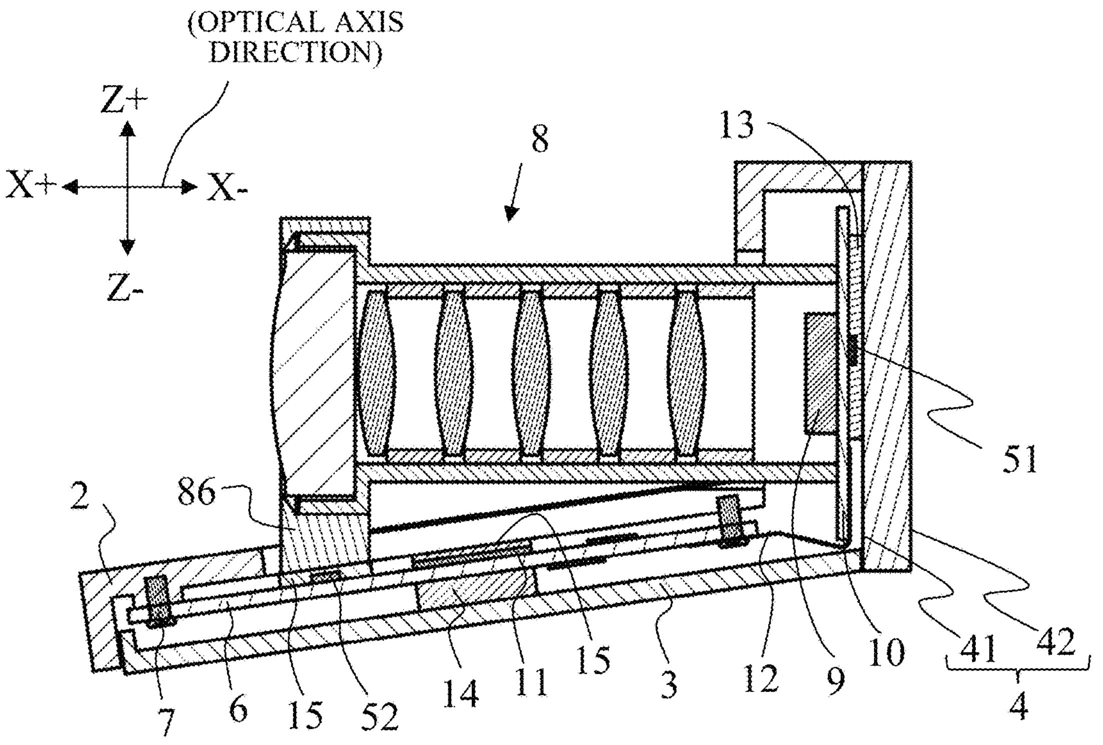
FIG. 5 is a sectional view of the image pickup apparatus according to the first embodiment.
Figure 6:
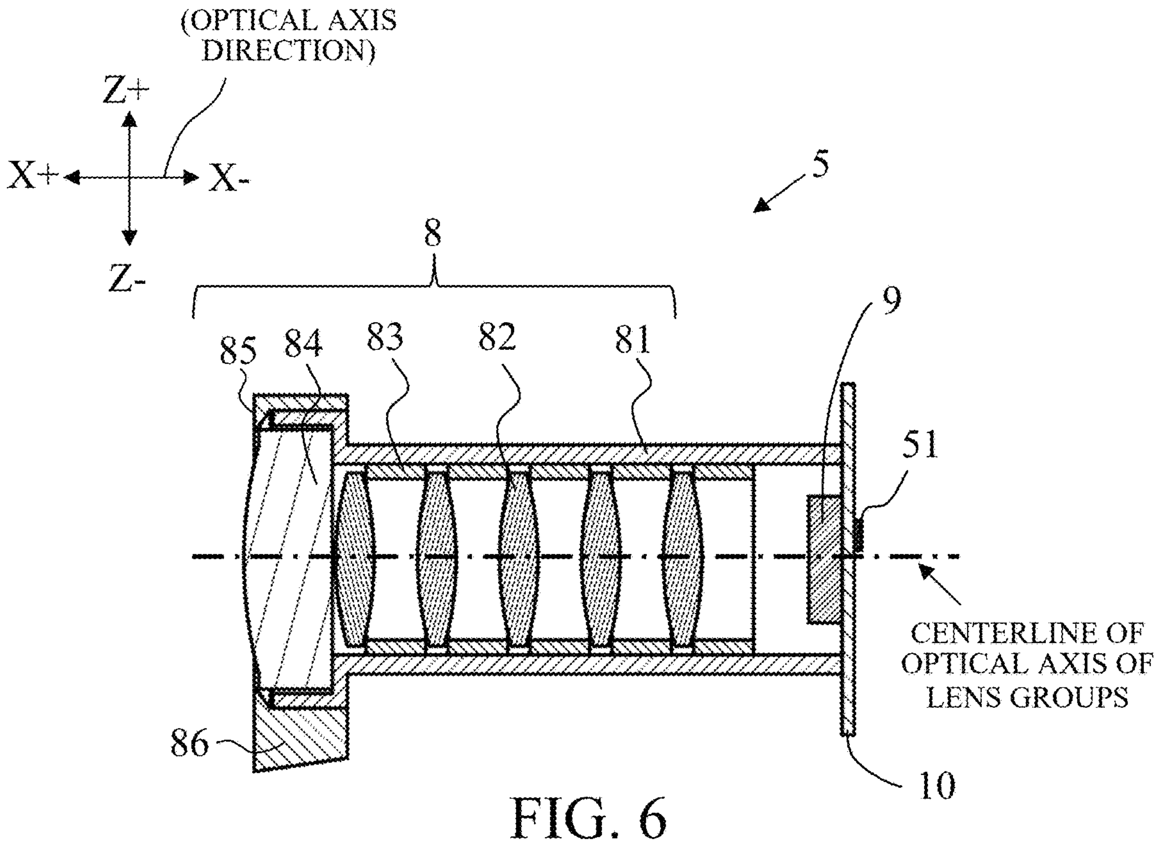
FIG. 6 is a sectional view of an image sensor unit according to the first embodiment.

FIGS. 4A and 4B are respectively an exterior view and an exploded view of the image pickup apparatus 1 according to this embodiment. FIG. 5 is a sectional view of the image pickup apparatus 1. FIG. 6 is a sectional view of an image sensor unit 5.

As illustrated in FIGS. 4A and 4B, in the image pickup apparatus 1, the image sensor unit 5 and the main body substrate 6 are housed within a housing, which is composed of an upper housing 2, a lower housing 3, and a rear housing 4.

The upper housing 2 is made of metal, such as aluminum, or resin and forms an outer shell of the image pickup apparatus 1 on an X+ direction side. The upper housing 2 includes a front wall 21, an upper wall 22, a right-side wall 23, a left-side wall 24, a front side wall 25, and an upper side wall 26, and functions as a mounting portion for attachment to vehicle 100. The front wall 21 is configured as a flat plate parallel to the image sensor 9 and is positioned facing outward from the vehicle 100. The front wall 21 has a hole for inserting the image sensor unit 5. The upper wall 22 intersects with the front wall 21. The upper wall 22 extends from an end plane on a Z− direction side of the front wall 21 along the X+ direction and is configured as a flat plate. The upper wall 22 has a hole that connects to the hole in the front wall 21 not to interfere with the image sensor unit 5. An upper cover 27 is installed to seal the hole in the upper wall 22. The upper cover 27 is made of metal, such as aluminum, or resin, and is joined using fastening components (not illustrated) such as screws or snap fits after the image sensor unit 5 is inserted. On a Z+ direction side of the upper wall 22, a heat dissipation fin (not illustrated) may be arranged. On a Z− direction side of the upper wall 22, the main body substrate 6, on which a plurality of electronic components is mounted, is attached.

The lower housing 3 is made of metal, such as aluminum, or resin and forms an outer shell of the image pickup apparatus 1 on a Z− direction side. The lower housing 3 is installed to cover the upper housing 2 on a Z− direction side. A flat part 31 is configured as a flat plate parallel to the upper wall 22.

The rear housing 4 is made of metal, such as aluminum, or resin and forms an outer shell of the image pickup apparatus 1 on an X− direction side. The rear housing 4 includes a front wall 41 and a rear wall 42. The front wall 41 is positioned approximately parallel to the image sensor substrate 10 and is joined to the upper housing 2 using fastening components (not illustrated) such as screws. A heat dissipation fin (not illustrated) may be attached to the rear wall 42.

The image sensor unit 5 is composed of the lens unit 8, the image sensor 9, and the image sensor substrate 10. The image sensor unit 5 is inserted into the hole in the upper housing 2 and secured with screws or adhesive. On an X− direction side of the image sensor unit 5 (an X− direction side surface of the image sensor substrate 10), an image sensor heat-conductive member 13 is layered. The image sensor heat-conductive member 13 is a thin, rubber-like material made of silicone or similar materials. The image sensor heat-conductive member 13 is in contact with the front wall 41 and conducts heat from the image sensor 9. The heat received by the front wall 41 is dissipated from the rear wall 42.

The lens unit 8 is attached to the image sensor substrate 10 at approximately a right angle, with its ends secured by adhesive or similar means. In this embodiment, the lens unit 8 is directly attached to the image sensor substrate 10, but the present disclosure is not limited to this configuration. For example, the lens unit 8 may be indirectly attached to the image sensor substrate 10 through the upper housing 2 or other components.

The lens unit 8 includes a cylindrical barrel 81 made of metal such as aluminum or resin. Inside the barrel 81, a plurality of lenses 82 and spacers 83 are housed. The plurality of lenses 82 is made of transparent materials such as glass or resin. Among the plurality of lenses 82, a wide-angle lens 84 is disposed closest to the imaging target. The wide-angle lens 84 is held by a retaining ring 85. The plurality of spacers 83 and the retaining ring 85 are made of metal such as aluminum or resin. The retaining ring 85 has a protrusion (protrusion member) 86 that extends from a Z− direction end in a direction perpendicular to the optical axis direction. The protrusion 86 is located close to the second temperature sensor 52.

In FIG. 6, the plurality of lenses 82 and spacers 83 are housed alternately with the same shape and quantity, but the present disclosure is not limited to this configuration. They may have different shapes or quantities, and the order in which they are housed may differ from the sequence illustrated in FIG. 6.

The image sensor 9 is mounted on a surface of the image sensor substrate 10, on a side of the lens unit 8, and is housed inside the barrel 81. The image sensor 9 serves as a primary heat source of the image sensor unit 5.

The image sensor substrate 10 is configured as a flat plate extending in the Y and Z directions and controls the image sensor 9. The first temperature sensor 51 is mounted on a surface of the image sensor substrate 10, opposite the side of the lens unit 8.

The main body substrate 6 is configured as a flat plate extending in the X and Y directions and is joined to a boss part of the upper wall 22 using fastening components such as screws 7. The main body substrate 6 may be joined to the lower housing 3. The main body substrate 6 and the image sensor substrate 10 are electrically connected through a wiring 12. A plurality of electronic components is provided on both Z+ and Z− sides of the main body substrate 6. The plurality of electronic components mounted on the main body substrate 6 includes the second temperature sensor 52 and the camera control IC 11.

The second temperature sensor 52 is mounted in proximity to the protrusion 86 and acquires the temperature on the imaging target side of the lens unit 8. An upper face side heat-conductive member 15 is stacked on the second temperature sensor 52. The upper face side heat-conductive member 15 is made of rubber-like material such as silicone or similar material and is configured as a thin film. The second temperature sensor 52 is thermally connected to the protrusion 86 through the upper face side heat-conductive member 15 and thus can acquire the temperature of the lens unit 8. However, if the second temperature sensor 52 is close enough to the protrusion 86 such that the temperature on the imaging target side of the lens unit 8 can still be acquired even with an air layer present, the use of the upper face side heat-conductive member 15 may not be necessary.

The camera control IC 11 integrally controls the entire image pickup apparatus 1. The upper face side heat-conductive member 15 is laminated in contact with at least some of the electronic components, including the camera control IC 11. The upper face side heat-conductive member 15 is in contact with the Z− direction side of the upper wall 22 and conducts heat from the electronic components. The upper wall 22 receives the heat conducted from the upper face side heat-conductive member 15 on the Z− direction side and dissipates it from the Z+ direction side.

A lower face side heat-conductive member 14 is stacked on the Z− direction side of the main body substrate 6. The lower face side heat-conductive member 14 is made of rubber-like material such as silicone or similar material and is configured as a thin film. The lower face side heat-conductive member 14 is in contact with at least some of the electronic components. The lower face side heat-conductive member 14 is in contact with a Z+ direction side of the lower housing 3 and conducts the heat from the electronic components. The lower housing 3 receives the heat conducted from the lower face side heat-conductive member 14 on the Z+ direction side and dissipates it from a Z− direction side. In FIGS. 4A and 4B, the main body substrate 6 and the upper wall 22 are located on the Z− direction side of the lens unit 8 but may be positioned on the Z+ direction side of the lens unit 8.

The first temperature sensor 51, in this embodiment, is provided on the surface of the image sensor substrate 10 opposite the side of the lens unit 8, but the installation position (second position) is not limited to this, as long as it can acquire the temperature on the side of the image sensor 9 of the lens unit 8. The first temperature sensor 51 is preferably installed within 15% of a length along the optical axis direction of the lens unit 8, starting from an end of an image pickup unit side of the lens unit 8.

Additionally, the second temperature sensor 52 is provided in this embodiment at a position close to the protrusion 86, but the installation position (first position) is not limited to this as long as it can acquire the temperature on the imaging target side of the lens unit 8. The second temperature sensor 52 is preferably installed within 15% of the length along the optical axis direction of the lens unit 8, starting from an end of the imaging target side of the lens unit 8.

Next, effects of the image pickup apparatus 1 according to this embodiment will be described. In this embodiment, the camera control IC 11 can determine the correction value for the distance measurement data by estimating (acquiring) temperature distribution of the lens unit 8 (information related to the temperature in the optical axis direction of the lens unit 8).

Figure 7:
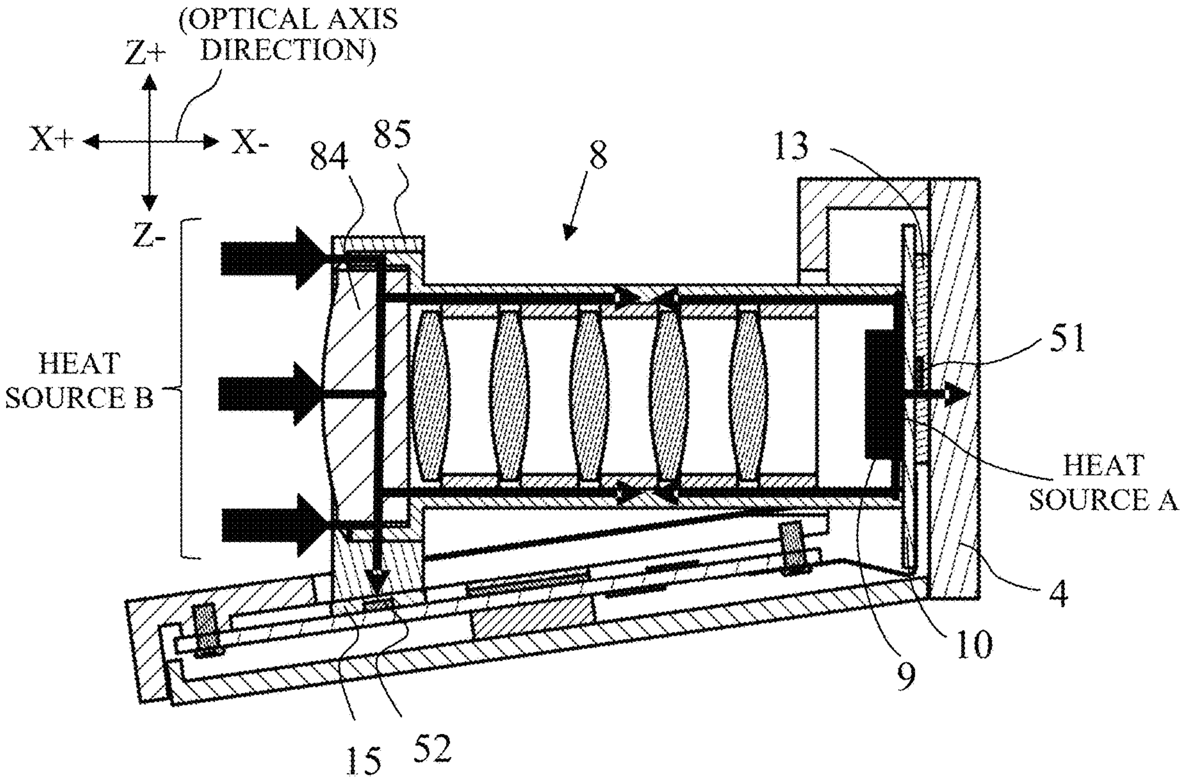
FIG. 7 is a diagram illustrating a heat transfer path around a lens unit according to the first embodiment.

FIG. 7 is a diagram illustrating a heat transfer path around the lens unit 8. Main heat sources are heat source A, which is heat generated by the image sensor 9 itself, and heat source B, which is caused by sunlight or similar factors. The heat source B can lead to focus shift (misfocus). Since the two heat sources are at both ends of the lens unit 8, if the temperatures at both ends can be acquired, the temperature distribution of the lens unit 8 can be estimated.

The heat source A transfers heat from the image sensor substrate 10 to the lens unit 8 and to the rear housing 4 through the image sensor heat-conductive member 13. The first temperature sensor 51 and the lens unit 8 are directly mounted on the image sensor substrate 10 and thus are thermally connected. Accordingly, the first temperature sensor 51 can acquire the temperature on the side of the image sensor 9 of the lens unit 8.

The heat source B transfers heat from the wide-angle lens 84 and the retaining ring 85 throughout the entire lens unit 8. The second temperature sensor 52 is positioned close to the protrusion 86, is thermally connected through the upper face side heat-conductive member 15 and can thus acquire the temperature on the imaging target side of the lens unit 8.

Figure 8:
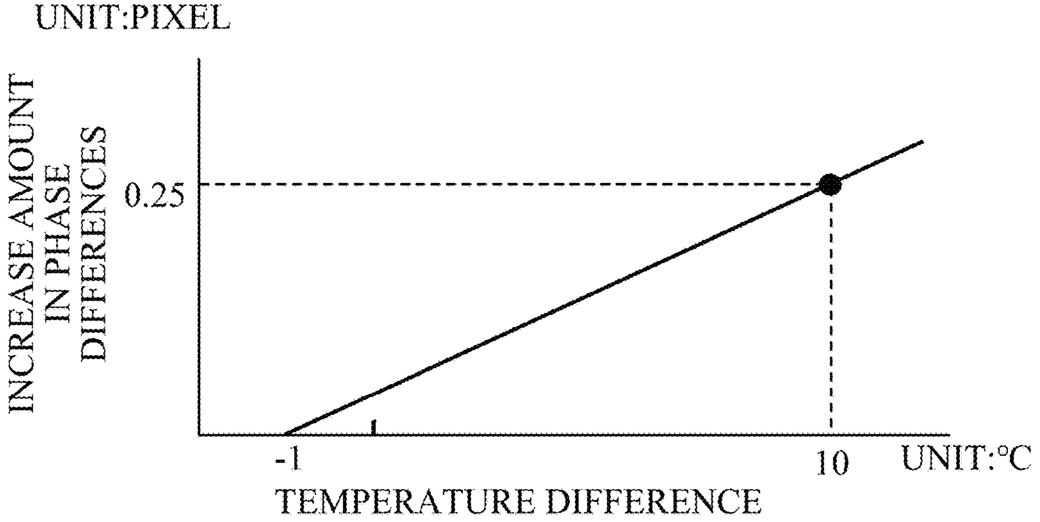
FIG. 8 is a graph illustrating a relationship between temperature differences at both ends of the lens unit and an amount of increase in phase differences according to the first embodiment.

FIG. 8 is a graph illustrating a relationship between temperature difference at both ends of the lens unit 8 and an amount of increase in phase differences. In FIG. 8, a horizontal axis is a value (temperature difference) obtained by subtracting the temperature on the side of the image sensor 9 of the lens unit 8 from the temperature on the imaging target side, and a vertical axis is the amount of increase in phase difference. The phase difference, which is the shift in the image signal generated by light entering the image sensor 9 through the lens unit 8, can be measured by a pixel unit. Thus, in FIG. 8, the amount of increase in phase differences is indicated as a value by a pixel unit. As illustrated in FIG. 8, when the heat source B does not exist, the temperature differences are −1, less than 0, and thus the increase in phase differences is 0. When the temperature of the heat source B rises, the temperature differences increase, and thus the amount of increase in phase differences also grows.

Figure 9A:
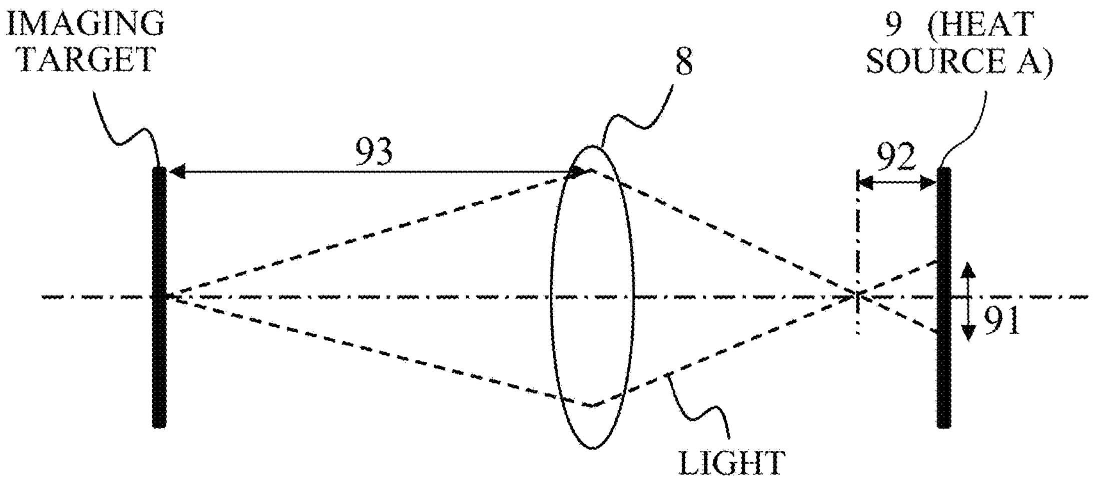
FIGS. 9A and 9B are conceptual diagrams illustrating a principle of acquiring distance measurement data.
Figure 9B:
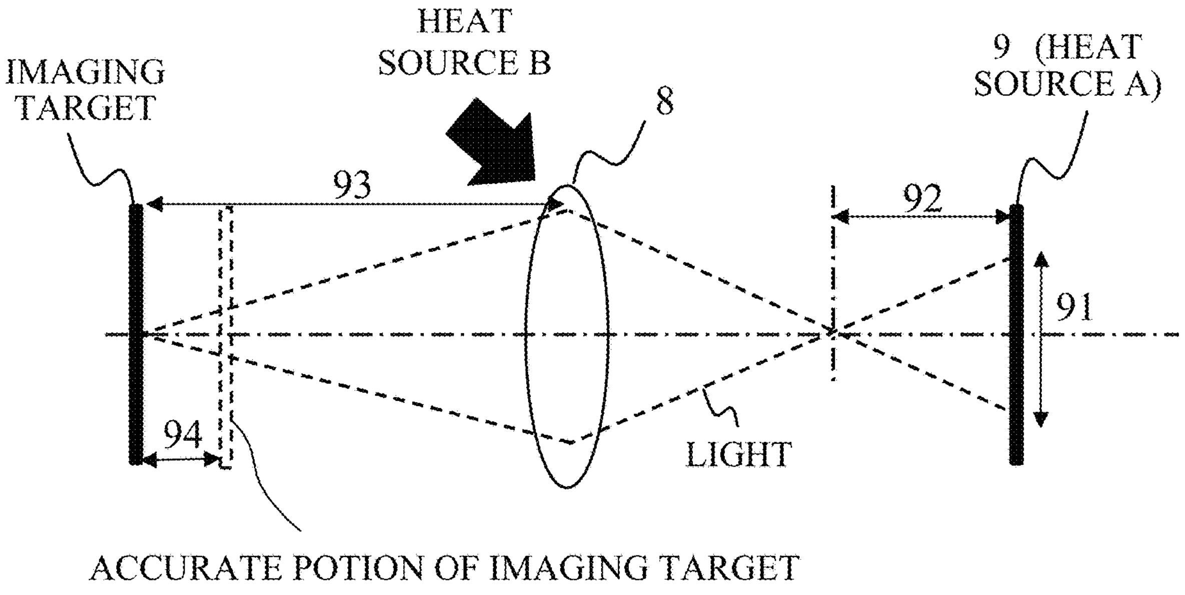

FIGS. 9A and 9B are conceptual diagrams illustrating a principle of acquiring the distance measurement data. FIG. 9A illustrates a state where only heat source A is present, and there is no shift in a focal position. FIG. 9B illustrates a state where both heat sources A and B are present, with a focal position shift compared to FIG. 9A. As previously described, the image sensor 9 acquires a phase difference 91, which is the shift in the image signal for each pixel, using the imaging plane phase difference method with light from the imaging target that enters through the lens unit 8. By multiplying the phase difference 91 by a coefficient set for each image pickup apparatus 1, a defocus amount 92 can be acquired. The defocus amount 92 can be converted to a distance 93 to the imaging target using lens design values (such as focal length and other related parameters) and the lens formula.

In FIG. 9B, the lens unit 8 shifts relative to its position in FIG. 9A due to the influence of the heat source B. The actual moving amount is on the order of several microns. The movement of the lens unit 8 results in an increase in the phase difference 91 and defocus amount 92. The distance 93 to the imaging target includes an error distance 94 relative to the true position of the imaging target. Thus, by subtracting the amount of increase in phase difference, which is calculated based on the temperature difference at both ends of the lens unit 8, from the phase difference 91 in FIG. 9B, it is possible to correct it to the phase difference 91 in FIG. 9A. As a result, the distance 93 to the imaging target can also be corrected.

As explained above, the configuration of this embodiment enables the accurate acquisition of distance measurement data by identifying the temperature distribution of the lens unit 8 and easily reducing the effect of focal position shifts caused by the expansion and contraction of the barrel 81 and lens.

Second Embodiment

Figure 10:
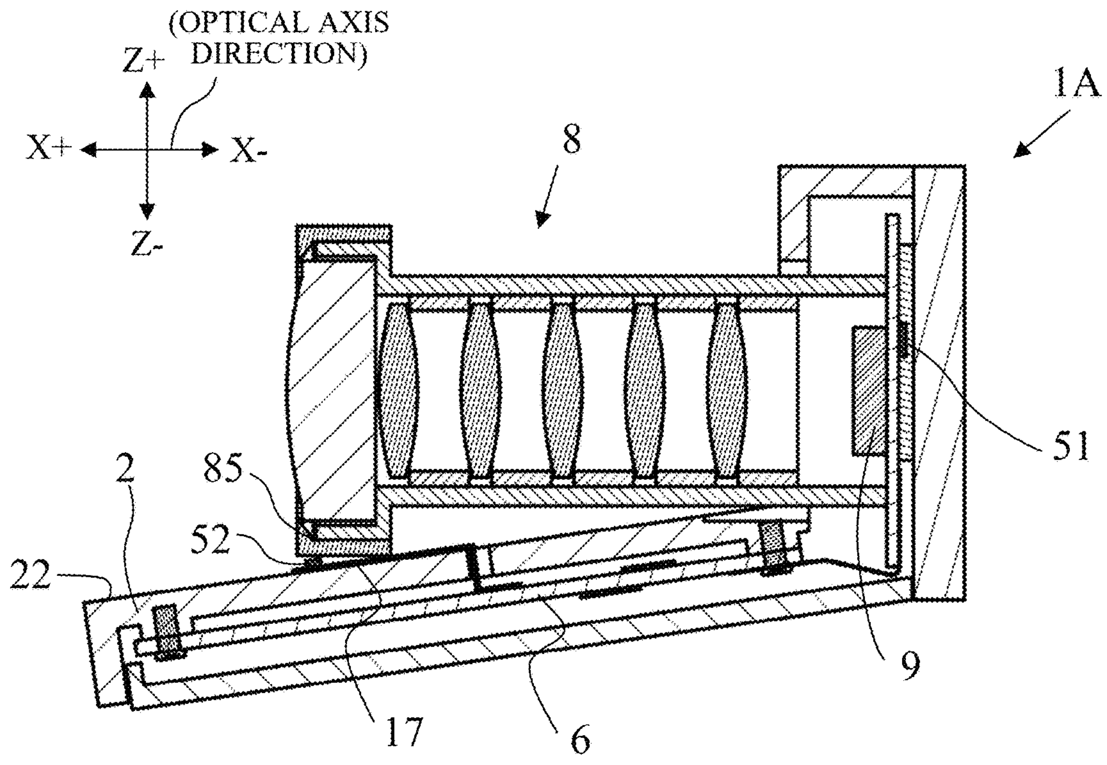
FIG. 10 is a sectional view of an image pickup apparatus according to a second embodiment.

FIG. 10 is a sectional view of an image pickup apparatus 1A according to this embodiment. The image pickup apparatus 1A differs from the image pickup apparatus 1 of the first embodiment in that the second temperature sensor 52 is installed on the flexible substrate 17, which is connected to the main body substrate 6, and is mounted on the upper wall 22. In the present embodiment, only the configuration differing from the first embodiment will be described, and common configurations will be omitted.

The upper wall 22 is provided with a hole for passing the flexible substrate 17. The flexible substrate 17 is attached to the upper wall 22 using fastening components such as screws, double-sided tape, or adhesive. The second temperature sensor 52 is mounted in proximity to the retaining ring 85. The second temperature sensor 52 may be connected to the retaining ring 85 by layering a heat-conductive member.

In the image pickup apparatus 1A, the first temperature sensor 51 can acquire the temperature on the image sensor 9 side of the lens unit 8. The second temperature sensor 52 is mounted in proximity to the retaining ring 85 and thus can acquire the temperature on the imaging target side of the lens unit 8. The amount of increase in phase differences is calculated (acquired) based on the temperature difference, which is obtained by subtracting the temperature acquired by the second temperature sensor 52 from that acquired by the first temperature sensor 51. The distance measurement data can be corrected by subtracting the calculated amount of increase in phase differences from the phase difference on which the distance measurement data is based.

As explained above, the configuration of this embodiment enables the accurate acquisition of distance measurement data by identifying the temperature distribution of the lens unit 8 and easily reducing the effect of focal position shifts caused by the expansion and contraction of the barrel 81 and lens.

Third Embodiment

Figure 11:
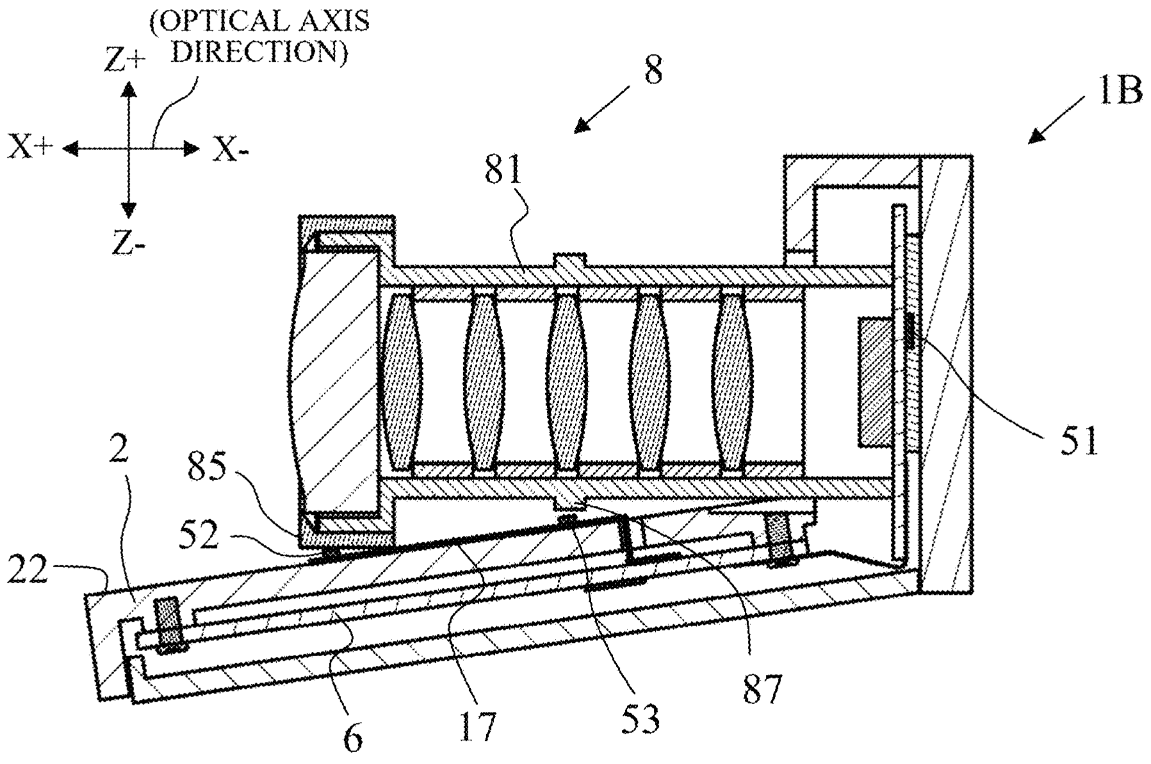
FIG. 11 is a sectional view of an image pickup apparatus according to a third embodiment.

FIG. 11 is a sectional view of an image pickup apparatus 1A according to this embodiment. The image pickup apparatus 1B differs from the image pickup apparatus 1 of the first embodiment in that the second temperature sensor 52 and a third temperature sensor 53 are installed on a flexible substrate 17 connected to the main body substrate 6 and attached to the upper wall 22. Additionally, the difference is that a projection 87 is installed on the outer shape of the barrel 81. In the present embodiment, only the configuration differing from the first embodiment will be described, and common configurations will be omitted.

The upper wall 22 is provided with a hole for passing the flexible substrate 17. The flexible substrate 17 is attached to the upper wall 22 using fastening components such as screws, double-sided tape, or adhesive. The second temperature sensor 52 is mounted in proximity to the retaining ring 85. The second temperature sensor 52 may be connected to the retaining ring 85 by layering a heat-conductive member. The third temperature sensor 53 is installed in proximity to the projection 87 provided on the outer shape of the barrel 81. The third temperature sensor 53 may be connected to the barrel 81 by layering a heat-conductive member. The projection 87 is configured in a protruding shape to facilitate connection with the third temperature sensor 53, but the shape is not limited to this. Additionally, the projection 87 may be made of a separate member from the barrel 81. In this embodiment, the position of the projection 87 is near the center along the optical axis direction of the lens unit 8, but the installation position is not limited to this. The projection 87 should be installed in a position effective for correcting phase difference shifts, such as near an adjustment lens that corrects focus shift caused by temperature changes, or near the area where the convex and concave portions on the barrel 81 join with the housing. If there is a point of temperature variation due to a combination of shape and material of a lens holding member, the projection 87 may be installed to detect a temperature close to that variation point.

In the image pickup apparatus 1, the first temperature sensor 51 is capable of acquiring the temperature on the side of the image sensor 9 of the lens unit 8. The second temperature sensor 52 is installed in proximity to the retaining ring 85 and thus can acquire the temperature on the side of the imaging target of the lens unit 8. The third temperature sensor 53 is in proximity to the projection 87 and thus can acquire a temperature at an intermediate part of the lens unit 8.

Figure 12A:
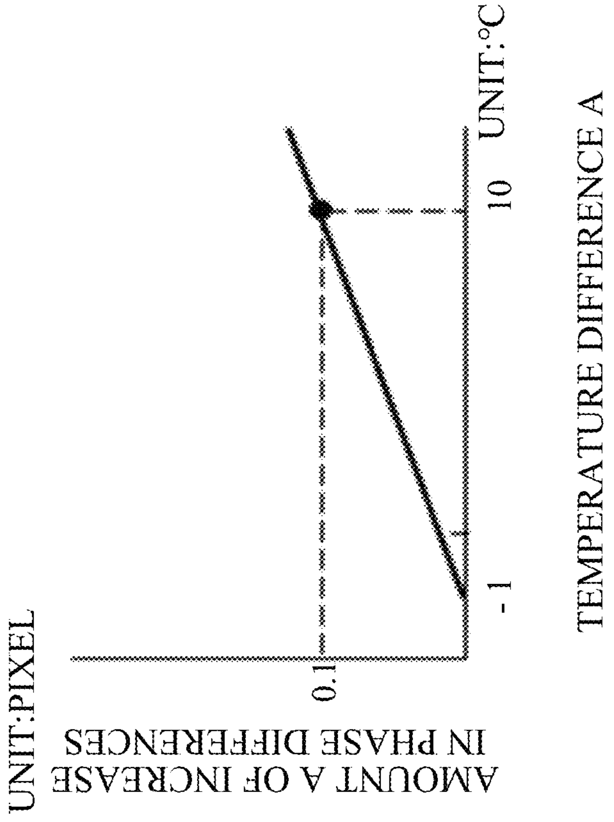
FIGS. 12A and 12B are graphs illustrating a relationship between temperature differences and an amount of increase in phase differences in a lens unit according to the third embodiment.
Figure 12B:
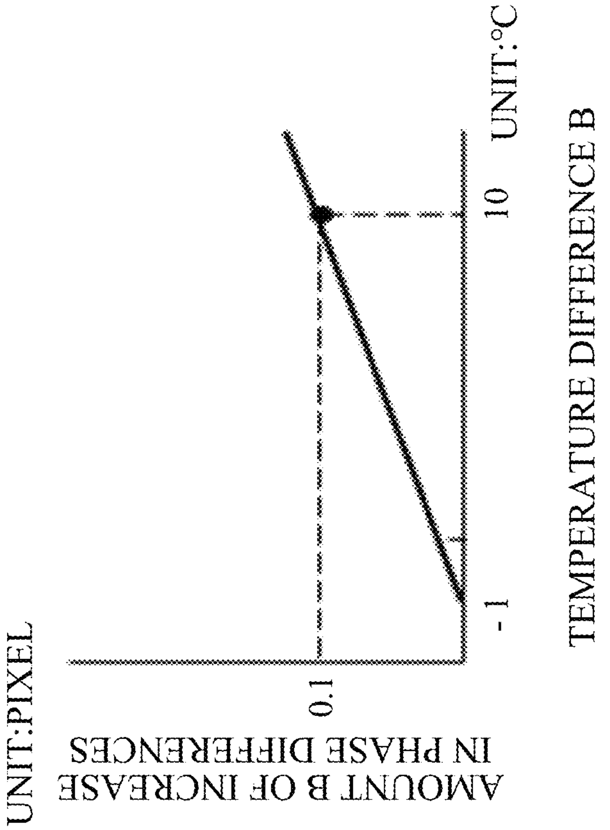

FIGS. 12A and 12B are graphs illustrating a relationship between temperature differences and an amount of increase in phase differences in the lens unit 8. In FIG. 12A, a horizontal axis is a value (temperature difference A) obtained by subtracting the temperature acquired by the third temperature sensor 53 from the temperature acquired by the first temperature sensor 51, and a vertical axis is an amount A of increase in phase differences. In FIG. 12B, a horizontal axis is a value (temperature difference B) obtained by subtracting the temperature acquired by the second temperature sensor 52 from the temperature acquired by the third temperature sensor 53, and the vertical axis is an amount B of increase in phase differences. The distance measurement data can be corrected by subtracting the amount A of increase in phase differences or the amount B of increase in phase differences from the phase difference on which the distance measurement data is based. The temperature difference B may be the value obtained by subtracting the temperature acquired by the second temperature sensor 52 from the temperature acquired by the first temperature sensor 51.

As explained above, the configuration of this embodiment enables the accurate acquisition of distance measurement data by identifying the temperature distribution of the lens unit 8 and easily reducing the effect of focal position shifts caused by the expansion and contraction of the barrel 81 and lens.

Other

The materials of the upper housing 2, the lower housing 3, the rear housing 4, the barrel 81, the spacers 83, and the retaining ring 85 are not specifically limited. Preferably, they are made of materials with high thermal conductivity, such as metals like aluminum, copper, zinc, and iron, or alloys made by mixing a plurality of metals.

The materials of the image sensor heat-conductive member 13, the lower face side heat-conductive member 14, and the upper face side heat-conductive member 15 are not specifically limited. For example, silicone or graphite may be used. Additionally, curable materials made by mixing two-component materials, or non-curable materials such as grease, may also be used.

On-Board System (In-Vehicle System)

Figure 13:
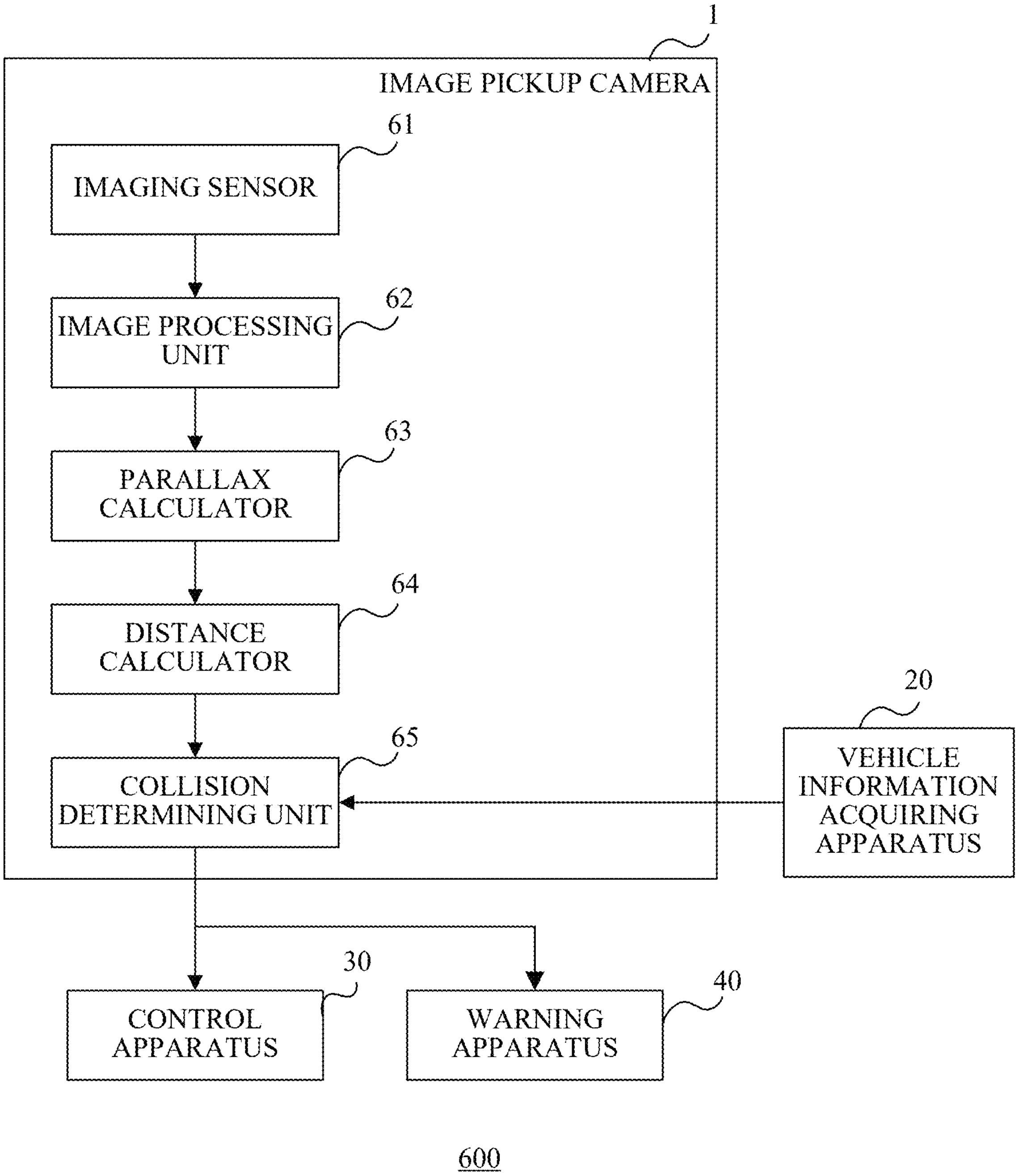
FIG. 13 is a functional block diagram of an on-board system according to an embodiment.
Figure 14:
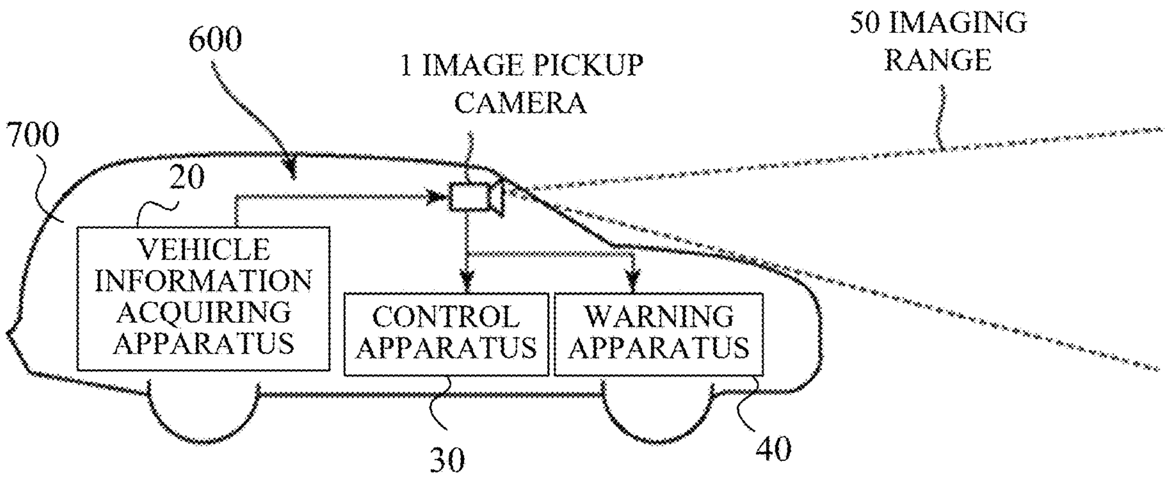
FIG. 14 is a schematic diagram of a main part of a vehicle according to the embodiment.

FIG. 13 illustrates a configuration of an image pickup apparatus 1 according to this embodiment and an on-board (in-vehicle) system (control system, driving support apparatus) 600 having the image pickup apparatus 1. The on-board system 600 is a system held by a movable apparatus (movable apparatus) such as an automobile (vehicle) and configured to support driving (steering) of the vehicle based on image information around the vehicle acquired by the image pickup apparatus which is an on-board camera. FIG. 14 illustrates a vehicle 700 as a movable apparatus having the on-board system 600. FIG. 14 illustrates a case where an imaging range 50 of the image pickup apparatus 1 is set in front of the vehicle 700, but the imaging range 50 may be set in the rear or side of the vehicle 700, for example.

As illustrated in FIG. 13, the on-board system 600 includes the image pickup apparatus 1, a vehicle information acquiring apparatus 20, a control apparatus (control unit, ECU: electronic control unit) 30, and a warning apparatus (warning unit) 40. The image pickup apparatus 1 includes an imaging unit 61, an image processing unit 62, a parallax calculator 63, a distance calculator 64, and a collision determining unit 65. The collision determining unit 65 may be included in the control apparatus 30. The image processing unit 62, the parallax calculator 63, the distance calculator 64, and the collision determining unit 65 constitute a processing unit. The imaging unit 61 includes an optical system according to any of the embodiments described above and an image sensor.

Figure 15:
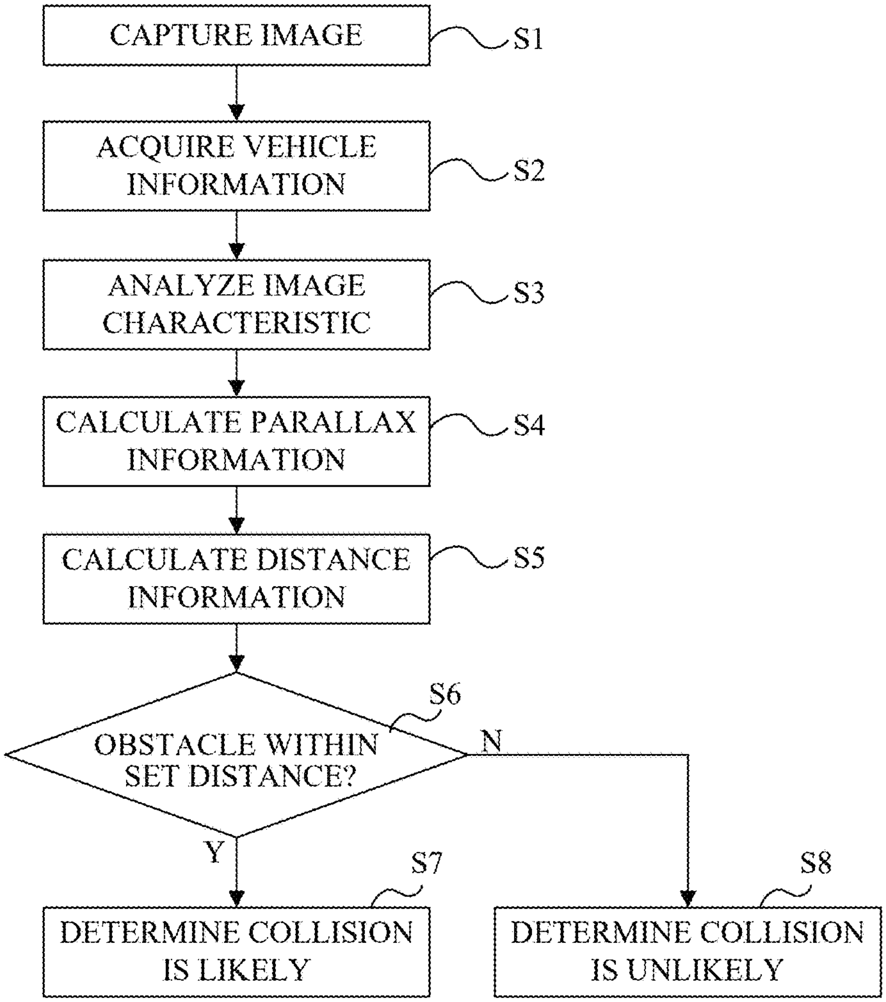
FIG. 15 is a flowchart illustrating an operation example of the on-board system according to the embodiment.

FIG. 15 is a flowchart illustrating an operation example of the on-board system 600 according to the embodiment. The operation of the on-board system 600 will be described below in accordance with this flowchart.

First, in step S1, an object such as an obstacle or a pedestrian around the vehicle is imaged using the imaging unit 61, and a plurality of image data (parallax image data) are acquired.

In step S2, the vehicle information acquiring apparatus 20 acquires vehicle information. Vehicle information includes a vehicle speed, a yaw rate, a steering angle, and the like of the vehicle.

In step S3, the image processing unit 62 performs image processing on the plurality of image data acquired by the imaging unit 61. Specifically, image feature analysis is conducted to analyze characteristics such as the amount and direction of edges and the density values within the image data. Here, the image feature analysis may be performed on each of the plurality of image data or on only a portion of the image data among the plurality.

In step S4, the parallax calculator 63 calculates parallax (image shift) information between the plurality of image data acquired by the imaging unit 61. Known methods such as the SSDA method and the area correlation method can be used as the parallax information calculating method, and a detailed description thereof will be omitted. Steps S2, S3, and S4 may be performed in the order described above or may be performed in parallel with each other.

In step S5, distance information to the object imaged by the imaging unit 61 is acquired (calculated) by the distance calculator 64. The distance information can be calculated based on the parallax information calculated by the parallax calculator 63 and internal and external parameters of the imaging unit 61. The distance information here refers to information about a position relative to the object, such as a distance to the object, a defocus amount, and an image shift amount, and may directly represent a distance value of the object in the image or indirectly represent information corresponding to the distance value.

In step S6, the collision determining unit 65 determines whether or not the distance to the object is within a preset distance range using the vehicle information acquired by the vehicle information acquiring apparatus 20 and the distance information calculated by the distance calculator 64. Thereby, it is possible to determine whether or not an object exists within the set distance around the vehicle, and to determine a likelihood of collision between the vehicle and the object. In a case where the object exists within the set distance, the collision determining unit 65 determines that "there is a likelihood of collision" (step S7), and in a case where the object does not exist within the set distance, the collision determining unit 65 determines that "there is no likelihood of collision" (step S8).

Next, in a case where the collision determining unit 65 determines that there is a likelihood of collision, the collision determining unit 65 notifies (transmits) the determination result to the control apparatus 30 and the warning apparatus 40. At this time, the control apparatus 30 controls the vehicle based on the determination result of the collision determining unit 65 (step S6), and the warning apparatus 40 warns the vehicle user (driver, passenger) based on the determination result of the collision determining unit 65 (step S7). The determination result may be notified to at least one of the control apparatus 30 and the warning apparatus 40.

The control apparatus 30 can control the movement of the vehicle by outputting a control signal to a driving unit (engine, motor, etc.) of the vehicle. For example, the control apparatus 30 performs control such as applying a brake in a vehicle, releasing an accelerator, turning a steering wheel, generating a control signal for generating a braking force in each wheel, and suppressing an output of an engine or a motor. The warning apparatus 40 warns the user, for example, by emitting a warning sound (warning alarm), displaying warning information on the screen of the car navigation system, or vibrating a seat belt or steering wheel.

The on-board system 600 according to this embodiment can effectively perform object detection and avoid collisions between the vehicle and the object. Specifically, by applying the optical systems according to each of the aforementioned embodiments to the on-board system 600, it becomes possible to detect objects and perform collision determination across a wide angle of view while reducing the overall size of the image pickup apparatus 1 and increasing the flexibility of its placement.

The distance information may be calculated by another method. For example, assume that a pupil division type image sensor having a plurality of pixel units regularly arranged in a two-dimensional array is applied to the image sensor in the imaging unit 61. In the pupil division type image sensor, one pixel unit includes a microlens and a plurality of photoelectric conversion units, receives a pair of light beams passing through different areas in the pupil of the optical system, and outputs a pair of image data from the respective photoelectric conversion units.

Then, an image shift amount of each area is calculated by correlation calculation between the paired image data, and image shift map data representing a distribution of image shift amounts is calculated by the distance calculator 64. Alternatively, the distance calculator 64 may further convert the image shift amount into a defocus amount and generate defocus map data representing a distribution of defocus amounts (distribution on the two-dimensional plane of the captured image). The distance calculator 64 may acquire distance map data of a distance to the object converted from the defocus amount.

The on-board system 600 or the vehicle 700 may include a notification apparatus (notification unit) configured to notify, if the vehicle 700 should collide with an obstacle, an on-board system manufacturer and a vehicle 700 dealer of the fact. For example, the notification apparatus may use an apparatus that transmits information (collision information) about the collision between the vehicle 700 and the obstacle to a preset external notification destination by e-mail or the like.

Thus, adopting a configuration in which the collision information is automatically notified by the notification apparatus can promptly respond to inspections and repairs after a collision occurs. The notification destination of the collision information may be an insurance company, a medical institution, the police, or an arbitrary destination set by the user. The notification apparatus may be configured to notify the notification destination not only of the collision information but also of failure information of each part and consumption information of consumables. The presence or absence of collision may be detected using distance information acquired based on the output from the distance calculator 64 or another detector (sensor).

This embodiment applies the on-board system 600 to driving support (collision damage reduction) but is not limited to this example. The on-board system 600 can be used for cruise control (including adaptive cruise control function) and automatic driving. The on-board system 600 can be applied not only to vehicles such as automobiles, but also to a moving body such as a ship, an aircraft, and an industrial robot. The embodiment is applicable not only to movable apparatuses but also to various apparatuses that use object recognition, such as intelligent transportation systems (ITS) and monitoring systems.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU), or the like) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), Blu-ray Disc (BD)™, or the like), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

According to the present disclosure, it is possible to provide a control apparatus that can acquire highly accurate distance measurement data.

This application claims priority to Japanese Patent Application No. 2024-006076, which was filed on Jan. 18, 2024, and which is hereby incorporated by reference herein in its entirety.

What is claimed is:

1. A control apparatus for controlling an image pickup apparatus including an image pickup unit configured to capture image data and a lens unit having a plurality of lenses, the control apparatus comprising:

a processor; and a memory storing a program that causes the processor to execute a plurality of tasks including:

an acquiring task configured to acquire information regarding a temperature along an optical axis direction of the lens unit;

a determining task configured to determine a correction value according to the information regarding the temperature, a generating task configured to generate first distance measurement data from the image data according to the temperature information, and to generate distance measurement data by correcting the first distance measurement data using the correction value, wherein the information regarding the temperature includes information on a first temperature at a first position on an imaging target side of the lens unit and a second temperature at a second position on an image pickup unit side of the lens unit, and wherein the processor determines the correction value based on differences between the first and second temperatures.

2. The control apparatus according to claim 1, wherein the information regarding the temperature includes information on a first temperature at a first position on an imaging target side of the lens unit, a second temperature at a second position on an image pickup unit side of the lens unit, and a third temperature at a third position between the first and second positions, and wherein the processor determines the correction value based on differences between the first and third temperatures and between the second temperature and either the first or third temperature.

3. The control apparatus according to claim 2, wherein the third position is any of a center along the optical axis direction of the lens unit, near an adjustment lens that corrects focus shift, or near a point of temperature variation corresponding to a combination of shape and material of a lens holding member.

4. The control apparatus according to claim 1, wherein the first position is included within 15% of a length along the optical axis direction of the lens unit, starting from an end on the imaging target side of the lens unit, and wherein the second position is included within 15% of the length along the optical axis direction of the lens unit, starting from an end on the image pickup unit side of the lens unit.

5. An image pickup apparatus comprising:

the control apparatus according to claim 1;

an image pickup unit configured to capture image data; and a lens unit including a plurality of lenses.

6. The image pickup apparatus according to claim 5, wherein the image pickup unit is capable of measuring phase differences by dividing a single pixel into a plurality of photodiodes, and wherein the processor generates the distance measurement data using the phase differences.

7. The image pickup apparatus according to claim 5, further comprising:

a main body substrate that is electrically connected to an image sensor substrate included in the image pickup unit;

a protrusion member that extends from the lens unit in a direction perpendicular to the optical axis direction; and a detector that is provided on the main body substrate to come closer to the protrusion member and detects a temperature at a position on an image target side of the lens unit.

8. The image pickup apparatus according to claim 5, further comprising:

a main body substrate that is electrically connected to an image sensor substrate included in the image pickup unit;

a flexible substrate that is connected to the main body substrate;

a housing that covers the main body substrate and is provided between the main body substrate and the lens unit; and a detector that is provided on a housing side of the flexible substrate, between the housing and the lens unit, and detects a temperature at a position on an image target side of the lens unit.

9. A control system comprising:

the image pickup apparatus according to claim 8; and a determining unit configured to determine a possibility of collision with an object based on distance information of the object acquired by the image pickup apparatus.

10. The control system according to claim 9, further comprising a control apparatus configured to output a control signal for generating a braking force to a driving unit of a moving apparatus in a case where it is determined that there is a possibility of collision between the moving apparatus and the object.

11. The control system according to claim 9, further comprising a warning apparatus configured to warn a driver of a moving apparatus in a case where it is determined that there is a possibility of collision between the moving apparatus and the object.

12. The control system according to claim 9, further comprising a notification unit configured to notify information regarding a collision between a moving apparatus and the object to the outside.

13. A moving apparatus comprising the image pickup apparatus according to claim 5, wherein the moving apparatus is configured to hold and movable with the image pickup apparatus.

14. The moving apparatus according to claim 13, further comprising a determining unit configured to determine a possibility of collision with an object based on distance information of the object acquired by the image pickup apparatus.

15. The moving apparatus according to claim 14, further comprising a notification unit configured to notify information regarding a collision with the object to the outside.

16. A control method for controlling an image pickup apparatus including an image pickup unit configured to capture image data and a lens unit having a plurality of lenses, the control method comprising steps of:

acquiring information regarding a temperature along an optical axis direction of the lens unit;

determining a correction value according to the information regarding the temperature, and generating first distance measurement data from image data according to the temperature information, and generating distance measurement data from the image data according to the information regarding the temperature, wherein the information regarding the temperature includes information on a first temperature at a first position on an imaging target side of the lens unit and a second temperature at a second position on an image pickup unit side of the lens unit, and wherein the processor determines the correction value based on differences between the first and second temperatures.

17. A non-transitory computer-readable storage medium storing a program that causes a computer to execute a control method for controlling an image pickup apparatus including an image pickup unit configured to capture image data and a lens unit having a plurality of lenses, the control method comprising steps of:

acquiring information regarding a temperature along an optical axis direction of the lens unit;

determining a correction value according to the information regarding the temperature, and generating first distance measurement data from the image data according to the temperature information, and generating distance measurement data from the image data according to the information regarding the temperature, wherein the information regarding the temperature includes information on a first temperature at a first position on an imaging target side of the lens unit and a second temperature at a second position on an image pickup unit side of the lens unit, and wherein the processor determines the correction value based on differences between the first and second temperatures.

* * * * *